United States Patent [19]
Azibert et al.

[11] Patent Number: 5,938,205
[45] Date of Patent: Aug. 17, 1999

[54] METHOD AND APPARATUS FOR OPTIMIZING BARRIER FLUID FLOW FOR PROMOTING COOL RUNNING OF A CARTRIDGE DUAL SEAL

[75] Inventors: Henri V. Azibert, Windham, N.H.; Arch Ray Clark, Rockport, Mass.

[73] Assignee: A.W. Chesterton Company, Stoneham, Mass.

[21] Appl. No.: 08/912,558

[22] Filed: Aug. 18, 1997

[51] Int. Cl.⁶ ........................................................ F16J 15/34
[52] U.S. Cl. ........................... 277/361; 277/358; 277/408
[58] Field of Search ................................... 277/361, 408, 277/358; 384/321

[56] References Cited

U.S. PATENT DOCUMENTS

| | | | |
|---|---|---|---|
| 2,470,419 | 5/1949 | Voytech | 277/408 X |
| 3,025,115 | 3/1962 | Shevchenko et al. | 308/187.1 |
| 4,466,619 | 8/1984 | Adams | 277/408 X |
| 5,203,575 | 4/1993 | Azibert et al. | 277/408 X |
| 5,333,882 | 8/1994 | Azibert et al. | 277/367 |
| 5,639,096 | 6/1997 | Ullah | 277/408 X |

FOREIGN PATENT DOCUMENTS

29713603U1  11/1997  Germany.

*Primary Examiner*—James R. Brittain
*Assistant Examiner*—Gary Grafel
*Attorney, Agent, or Firm*—Lahive & Cockfield, LLP

[57] ABSTRACT

A dual cartridge seal includes first and second rotary seals each formed by a stationary sealing ring and a rotatable sealing ring and a sleeve, fitted to be co-rotatable with a rotatable shaft to be sealed. The rotatable sealing rings are mounted on the sleeve. The stationary sealing rings are mounted so as to be radially spaced from the sleeve so that the stationary sealing rings and a portion of the sleeve define a barrier fluid chamber. The barrier fluid chamber has an inner wall defined by the portion of the sleeve, and an outer wall defined by the inner surface of the stationary sealing rings or ring holders. In order to promote barrier fluid circulation within the barrier fluid chamber, and thereby to more effectively remove heat from the regions of the rotary seals, the inner wall and the outer radial wall are oriented so that at least one of those walls is non-parallel to the rotational axis of the shaft.

47 Claims, 8 Drawing Sheets

METHOD AND APPARATUS FOR OPTIMIZING BARRIER FLUID FLOW FOR PROMOTING COOL RUNNING OF A CARTRIDGE DUAL SEAL

BACKGROUND OF THE INVENTION

1. Field of the Invention

The present invention is directed to a dual cartridge seal, and in particular to a cartridge dual seal structure, and a method for operating a cartridge dual seal, wherein barrier fluid flow is optimized in order to promote cool running of the seal.

2. Description of the Prior Art

A cartridge dual seal is used in a journal or bearing for a rotating element, such as a rotating shaft, in order to permit rotation of the shaft relative to a stationary element, while maintaining a seal for lubricant or in seals for pump shafts for sealing process material from the environment. Such a mechanical seal assembly typically includes one or two pairs of seal rings, one seal ring in each pair being stationary with respect to the seal assembly housing, and the other seal ring in each pair being mounted for rotation with the shaft. The seal rings in each pair respectively have faces in sliding contact with each other. When two such pairs of seal rings are used, a volume between the seal rings may be flushed with a barrier fluid in order to cool and lubricate the seal, as well as to provide a secondary source of sealing and/or a source of lubrication.

The basic structure of a known cartridge dual seal is shown in FIGS. 7 and 8.

FIG. 7 shows the basic components, and FIG. 8 shows the same components plus further structural details. A seal assembly 2 is mounted on a rotatable shaft 1. The seal assembly 2 includes a sleeve 3 fitted around the shaft 1 and held in place, together with other components by a locking ring 4. Between the sleeve 3 and the locking ring 4, two rotating seal rings 5 and 6 are held in place, with the assistance of gaskets (e.g., O-rings) 12 and 13. The rotating seal ring 5 has a face which is in sliding contact with a face of a stationary seal ring 7, and the rotating seal ring 6 has a face which is in sliding contact with a face of another stationary seal ring 8. The seal rings 5 and 7 form a first seal ring pair, and the seal rings 6 and 8 form a second seal ring pair.

The stationary seal rings 7 and 8 are held in place between the rotating seal rings 5 and 6 by a spacer 9, disposed between the stationary seal rings 7 and 8. The spacer 9 has an opening therein, described in more detail in connection with FIG. 8, through which barrier fluid is introduced into a barrier fluid chamber 10, as viewed in a radial plane completely containing the shaft axis. The sleeve 3 has an outer surface 3a, and the barrier fluid chamber 10 is defined by the continuous spaces between the surface 3a and the spacer 9, between a surface 7a of the stationary sealing ring 7 and the surface 3a, between a surface 8a of the stationary sealing ring 8 and the surface 3a, and axially-spaced edge volumes respectively between the rotating sealing ring 5 and the stationary sealing ring 7, and between the rotating sealing ring 6 and the stationary sealing ring 8. As is conventional, and as shown in FIGS. 7 and 8, the surfaces 7a and 8a are coplanar and parallel to the surface 3a.

Further structural details of the sealing assembly 2 can be seen in FIG. 8. The locking ring 4, and the components contained therein, are held in place on the rotating shaft 1 by means of clips 15 each having a peg which respectively extends through corresponding openings in the sleeve 3 so as to abut the outer surface of the shaft 1. One such peg 16 extending through one such opening 17 can be seen in FIG. 8. The lock ring 4 is tightened onto the shaft 1 by a number of set screws (not shown). A screw 18 attaches the clip 15 to the lock ring 4.

As also shown in FIG. 8, the rotating sealing ring 5 is urged into sliding contact with the stationary sealing ring 7 by means of a spring 20. A pin 19 engages the lock ring 4, thus imparting rotation to the rotating sealing ring 5. The spring 20 is a compression spring, and thus forces the rotating sealing ring 5 against the stationary sealing ring 7. An identical arrangement is used for the rotating sealing ring 6, but in view of the other components in the vicinity, reference numerals and lead lines have been omitted to improve the clarity of the drawing.

As also shown in FIG. 8, a housing 21 via which barrier fluid is fed from a barrier fluid source by a pump or other pressure source 28 into the barrier fluid chamber 10 is disposed above the stationary sealing rings 7 and 8, with O-rings 26 and 27 being disposed between the housing 21 and the respective stationary sealing rings 7 and 8. The housing 21 contains an opening 22, which may be threaded, in order to receive a conduit or other means for introducing barrier fluid from the barrier fluid source via the pressure source 28. The opening 22 communicates with the chamber 10 via a barrier fluid inlet 23. The barrier fluid exits the chamber 10 (minimally) through the respective interfaces between the sealing rings 5 and 7 and the sealing rings 6 and 8.

The housing 21 has an annular channel 24 which is in engagement with a lip 25 of the clip 15, so as to fix the relative positions of all of the components during installation. Additional O-rings 11 and 14 are provided as needed.

As noted above, one of the purposes of the barrier fluid introduced to the barrier chamber 10 is to lubricate and cool the seal assembly 2, particularly the confronting faces of the sealing rings 5–8. For this purpose, it is important that the barrier fluid not be stagnant in the chamber 10, otherwise heat pockets having unacceptably high temperatures develop in the chamber. For this purpose, the barrier fluid can be circulated through an external cooling system to remove heat from the seal and to maintain sufficiently low face temperatures. The success of these known systems, however, depends largely on the ability of the barrier fluid to reach the warmest regions of the seal, namely the respective interfaces of the sealing ring pairs. This has been a persistent problem in the art because the interfaces are located at the end or edge regions of the barrier fluid chamber, whereas the barrier fluid is introduced in a central region of the chamber. The barrier fluid chamber, because of confinements necessitated by the overall seal structure, offers flow passages between its central region and its edge regions which are relatively narrow. Efforts to improve the flow behavior of the barrier fluid in the barrier fluid chamber, and thereby to promote more efficient heat removal, have included the use of conventional flow enhancing components, such as baffles (which require large amounts of space), but the problem of efficient heat removal from the interfaces in a cartridge dual seal still has not been satisfactorily resolved.

SUMMARY OF THE INVENTION

It is an object of the present invention to provide a cartridge dual seal arrangement of the type generally described above, wherein flow of the barrier fluid within the barrier fluid chamber is optimized, thereby promoting relatively cool (or cooler) running of the overall seal assembly.

It is a further object of the present invention to provide a method, suitable for use in a dual cartridge seal, for optimizing the barrier fluid flow in the barrier fluid chamber for the purpose of promoting relatively cool (or cooler) running of the overall seal assembly.

The above objects are achieved in accordance with the principles of the present invention in a method and apparatus wherein the outer sleeve surface and the respective surfaces of the stationary sealing rings which face the sleeve are oriented in an angled (slanted) relationship to the shaft axes. At least one of these surfaces is axially frustoconical (along the shaft's axis of rotation).

In a first embodiment of the invention, the non-parallel relationship is formed by a flat outer sleeve surface with the respective surfaces of the stationary sealing rings being inclined or slanted or tapered relative to the outer sleeve surface. In one version of this embodiment, the respective surfaces of the stationary sealing rings can be inclined outwardly proceeding from the center of the barrier fluid chamber, i. e., the respective surfaces of the stationary sealing rings increasingly diverge from the outer sleeve surface proceeding from the center of the barrier fluid chamber to the respective regions of the outer edges of the fluid chamber area.

In another embodiment of the invention, the portion of the outer surface of the sleeve within the barrier fluid chamber and facing the respective stationary sealing rings 7 and 8, is inclined or tapered, so that it has a smaller outer diameter in a region at the center of the barrier fluid chamber and a larger outer diameter at respective regions near the outer edges of the barrier fluid chamber. In this embodiment, the respective surfaces of the stationary sealing rings within the barrier fluid chamber are inclined in the same manner as in the first embodiment, i. e., the surfaces are spaced farther from the outer surface (and thus farther from its rotational axis) of the rotating shaft (i. e., farther from the inner surface of the sleeve) at the outer edges of the barrier fluid chamber than at the center of the barrier fluid chamber. The respective surfaces of the stationary sealing rings may be inclined so as to be parallel to the inclined surface regions of the outer sleeve surface (but the overall relationship is non-axial).

In a further embodiment, the regions of the outer sleeve surface are inclined as in the embodiment described immediately above, but the respective surfaces of the stationary sealing rings disposed in the barrier fluid chamber are inclined in an opposite direction, i. e., the surfaces each are disposed farthest from the outer surface of the rotating shaft and the inner surface of the sleeve at the center of the barrier fluid chamber, and are disposed closest to the shaft and the inner surface of the sleeve at respective regions at the edges of the barrier fluid chamber. The respective surfaces of the stationary sealing rings within the barrier fluid chamber are thus inclined in an opposite direction to the inclined surface regions of the outer surface of the sleeve.

All of these embodiments have in common that the barrier fluid chamber, when viewed from the side, i. e., when viewed in a sectional plane extending radially through and completely containing the rotational axis of the shaft, has a non-parallel top and bottom. By tapering one or both of the surfaces of the stationary sealing rings and the outer sleeve surface within the barrier fluid chamber, increased flow of the barrier fluid within the barrier fluid chamber is promoted, thereby improving the cooling capabilities of the barrier fluid flow. This improvement is achieved because as the predominantly circumferential flow of barrier fluid approaches the respective planes at which the central region of the barrier fluid chamber, into which the barrier fluid is introduced, communicates with the channels leading to the respective axial ends of the barrier fluid chamber, regions of relatively high pressure deflect the barrier fluid slightly outwardly in the respective directions of the seal interfaces. As this occurs, the centrifugal forces acting on the rotating barrier fluid develop an axial motion component directed along the tapered surfaces of the sleeve. This combination of effects accomplishes the desired result of propelling the barrier fluid along a spiral path toward the axial ends of the barrier fluid chamber.

Even though heat pockets may still develop within the barrier fluid chamber, these heat pockets will be of a lower temperature and/or of a more transient nature than heat pockets which develop in a conventional barrier fluid chamber having parallel sides, as a result of the improved barrier fluid flow. The overall running temperature of the seal assembly is thereby reduced. For a seal assembly used with a shaft rotating at a given speed and pressure, this will thereby increase the service life of the seal assembly components. Conversely, for a given service life of components in a seal assembly, the shaft sealed by the assembly can be operated at faster rotational speeds or higher pressures.

DESCRIPTION OF THE PREFERRED EMBODIMENTS

Figure 1:
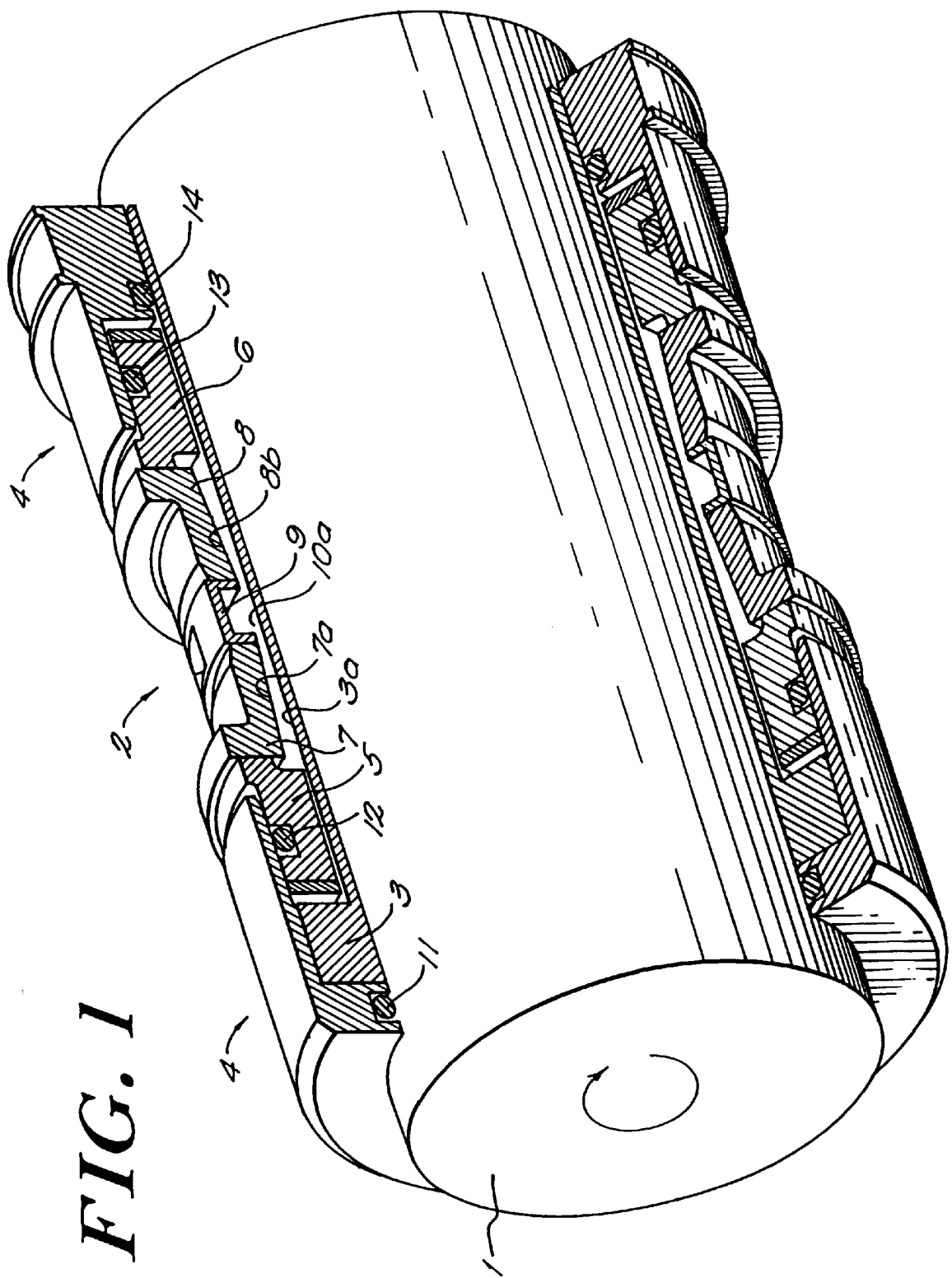
FIG. 1 is a perspective view, partly broken away, of a first embodiment of a seal assembly constructed and operating in accordance with the principles of the present invention.

In FIGS. 1 through 6, components which are the same as those already described above in connection with FIGS. 7 and 8 have been provided with the same reference numerals, and a repetition of their description and function is unnecessary. In each of the respective embodiments shown in FIGS. 1 and 2, FIGS. 3 and 4, and FIGS. 5 and 6, the respective surfaces of the stationary sealing rings 7 and 8 which are disposed in the respective barrier fluid chambers 10a, 10b and 10c described below form an outer wall for the barrier fluid chamber, and the portions 3a and 3b of the outer surface of the sleeve 3 form an inner surface of the respective barrier fluid chambers 10a, 10b and 10c. In all cases, but with different individual configurations, the outer wall of the barrier fluid chamber and the inner wall thereof are non-parallel (in that they are not parallel to the shaft axis) when viewed in a radial plane extending through the rotational axis of the shaft 1.

Figure 2:
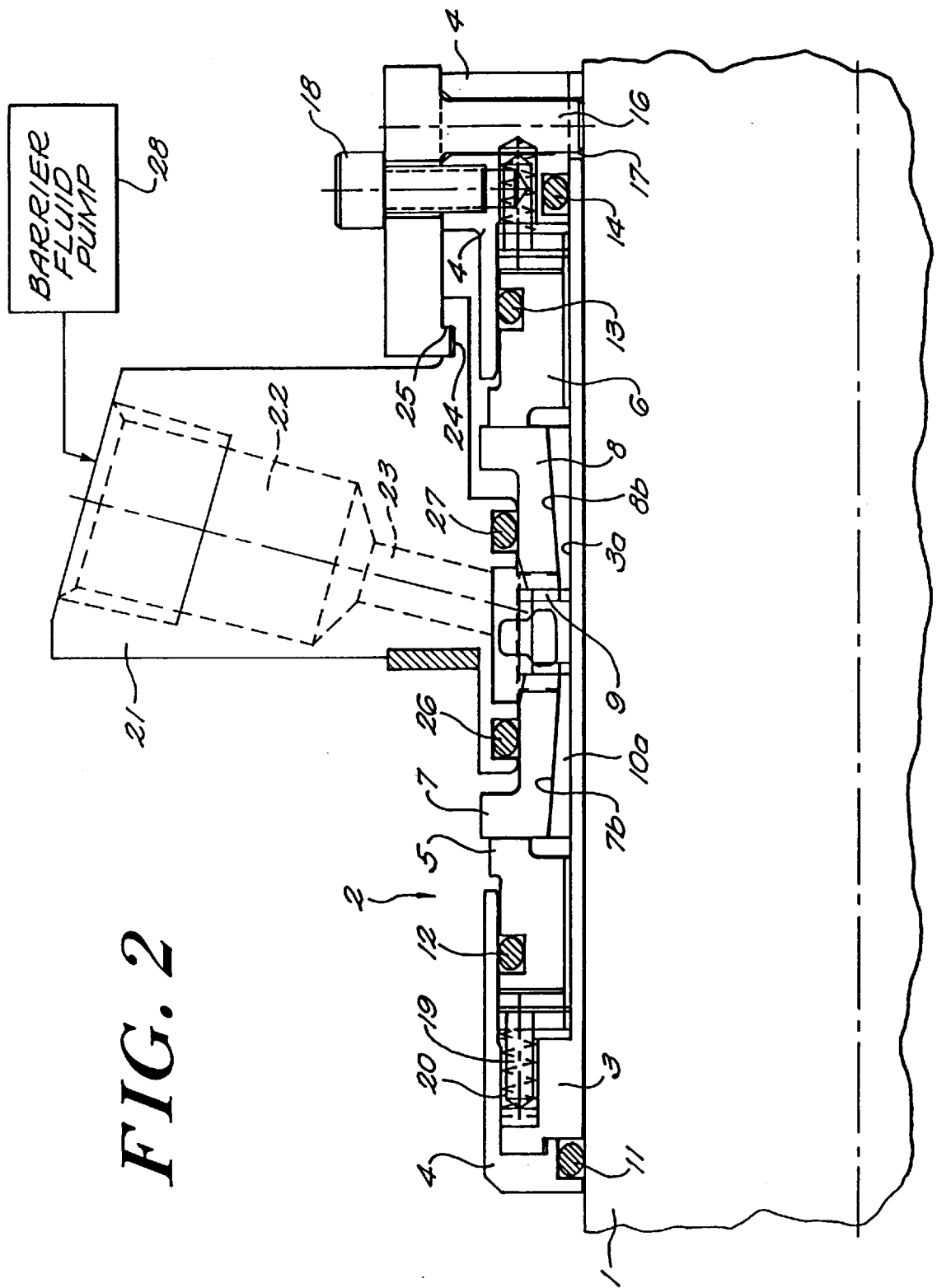
FIG. 2 is a sectional view (but without sectional hatching) of the first embodiment of the seal assembly shown in FIG. 3, with additional components.

In the embodiment of FIGS. 1 and 2, the barrier fluid chamber 10a has a flat inner wall formed by the region 3a of the outer surface of the sleeve 3 which is disposed in the barrier fluid chamber 10a. The barrier fluid chamber 10a has an outer wall, formed by the faces 7b and 8b of the respective stationary sealing rings 7 and 8, which is non-parallel to the inner wall formed by the region 3a. In this case, the surfaces or faces 7b and 8b are inclined so as to be closest to the surface 3a (and thus also closest to the inner surface of the sleeve 3 and the outer surface and rotational axis of the shaft 1) at a central region of the barrier fluid chamber 10a. The faces 7b and 8b are farthest from the surface 3a near the respective axial edges of the barrier fluid chamber 10a. The surfaces 7b and 8b are inclined in a straight-line manner between the central region of the barrier fluid chamber 10a and the respective axially-spaced edge regions of the barrier fluid chamber 10a so as to increasingly diverge from the sleeve 3 and the shaft 1 in both axial directions from a central location of the chamber.

Figure 3:
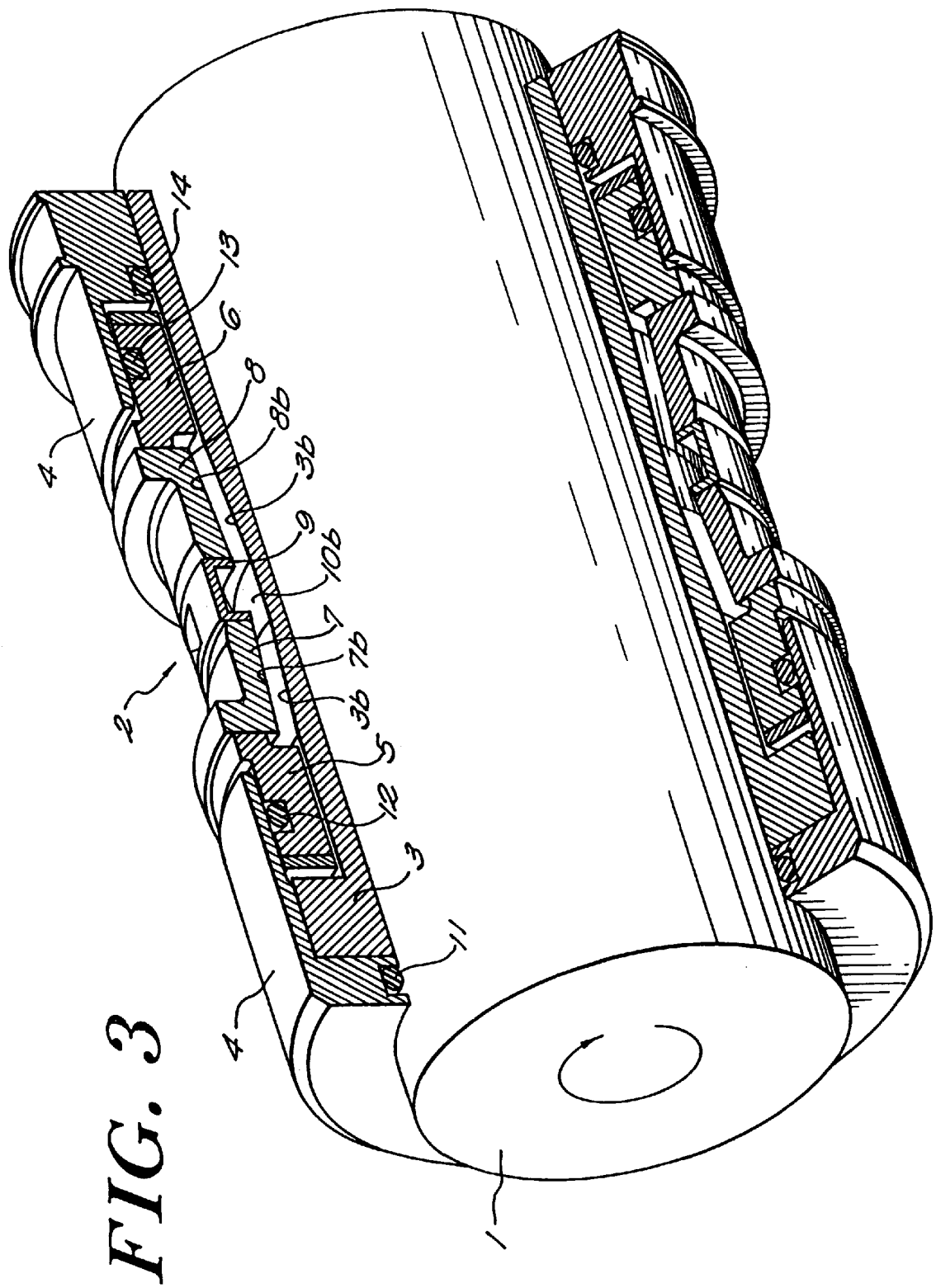
FIG. 3 is a perspective view, partly broken away, of a second embodiment of a seal assembly constructed and operating in accordance with the principles of the present invention.
Figure 4:
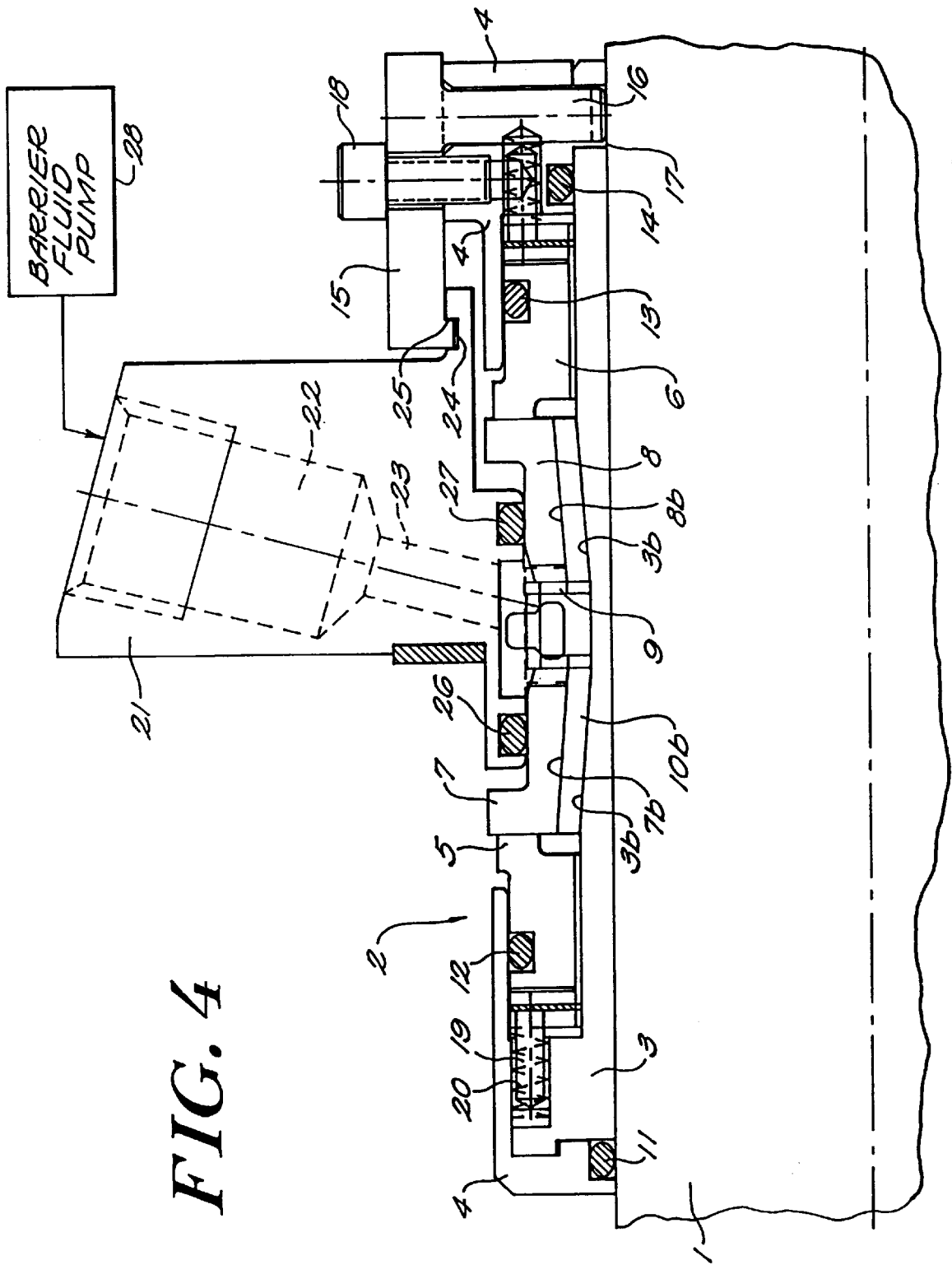
FIG. 4 is a sectional view (but without sectional hatching) of the second embodiment of the seal assembly shown in FIG. 5, with additional components.

In the embodiment shown in FIGS. 3 and 4, the surfaces 7b and 8b of the respective stationary seal rings 7 and 8 are the same as shown in the embodiment of FIGS. 1 and 2, that is, the surfaces diverge radially outwardly from a central region of the chamber. In this embodiment, however, the surface region 3b of the sleeve 3 disposed in the barrier fluid chamber 10b has a tapered, inclining portion, as illustrated. The sleeve surface 3b has a concavity or depression such that the surface inclines or diverges outwardly away from the shaft in both axial directions. Specifically, the sleeve surface 3b is inclined so as to be closest to the shaft 1 in the central region of the barrier fluid chamber 10b, and farthest from the shaft 1 at the respective axial edge regions of the barrier fluid chamber 10b. The surface 3b is shown to be parallel to the respective seal surfaces 7b and 8b in the embodiment of FIGS. 3 and 4 (but the overall outer and inner walls 3b, 7b, and 8b of the barrier fluid chamber 10b are non-parallel to the shaft axis), however, the inclined portions 3b of the sleeve 3 need not necessarily be inclined at the same angle as the surfaces 7b and 8b, and thus need not be truly parallel to each other. The illustrated embodiment can thus generally be characterized as an embodiment wherein both the outer and inner walls of the barrier fluid chamber 10b diverge radially and/or axially outwardly from the shaft 1, proceeding from the center of the barrier fluid chamber 10b to its respective axial edges.

Figure 5:
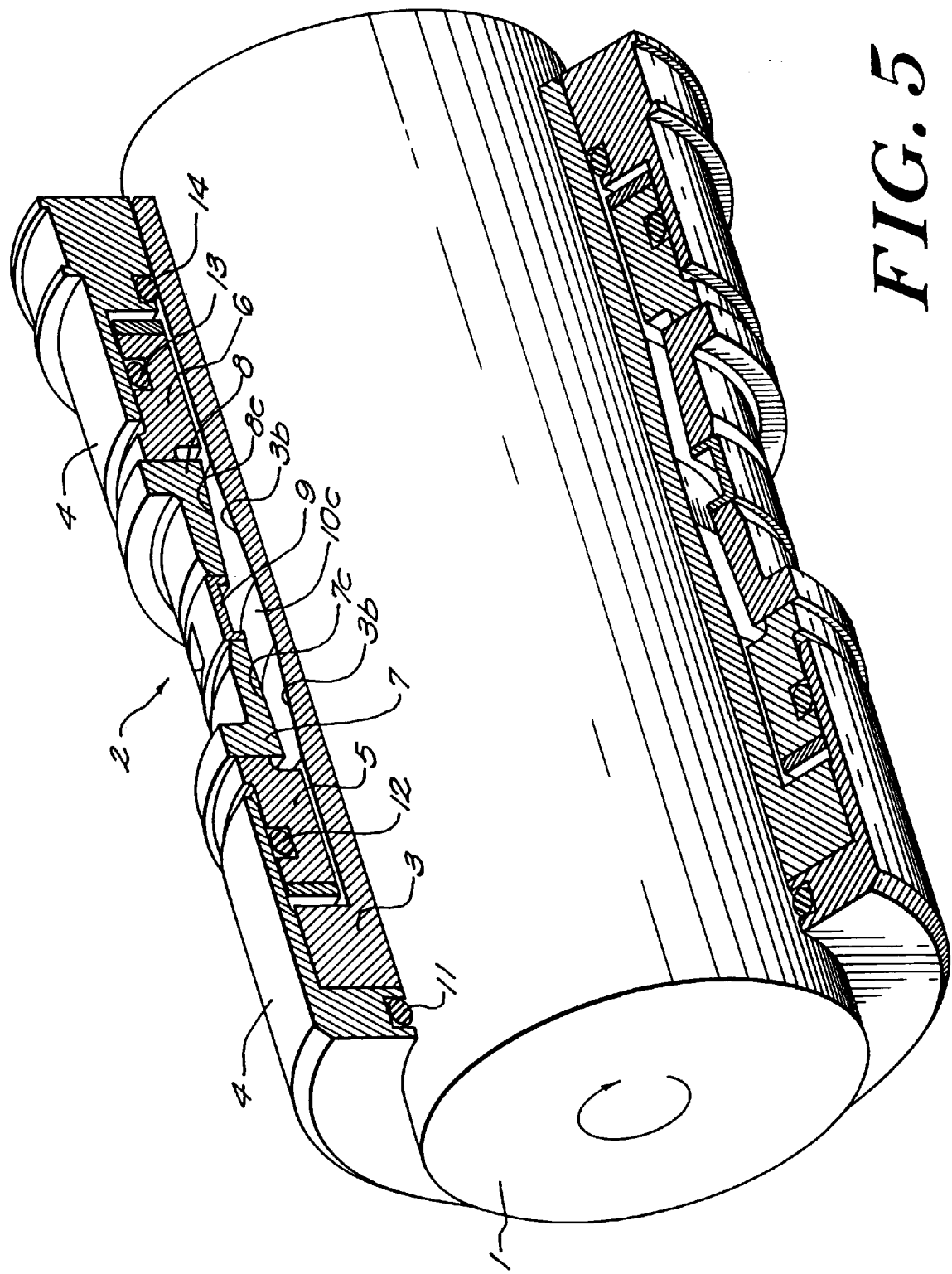
FIG. 5 is a perspective view, partly broken away, of a third embodiment of a seal assembly constructed and operating in accordance with the principles of the present invention.
Figure 6:
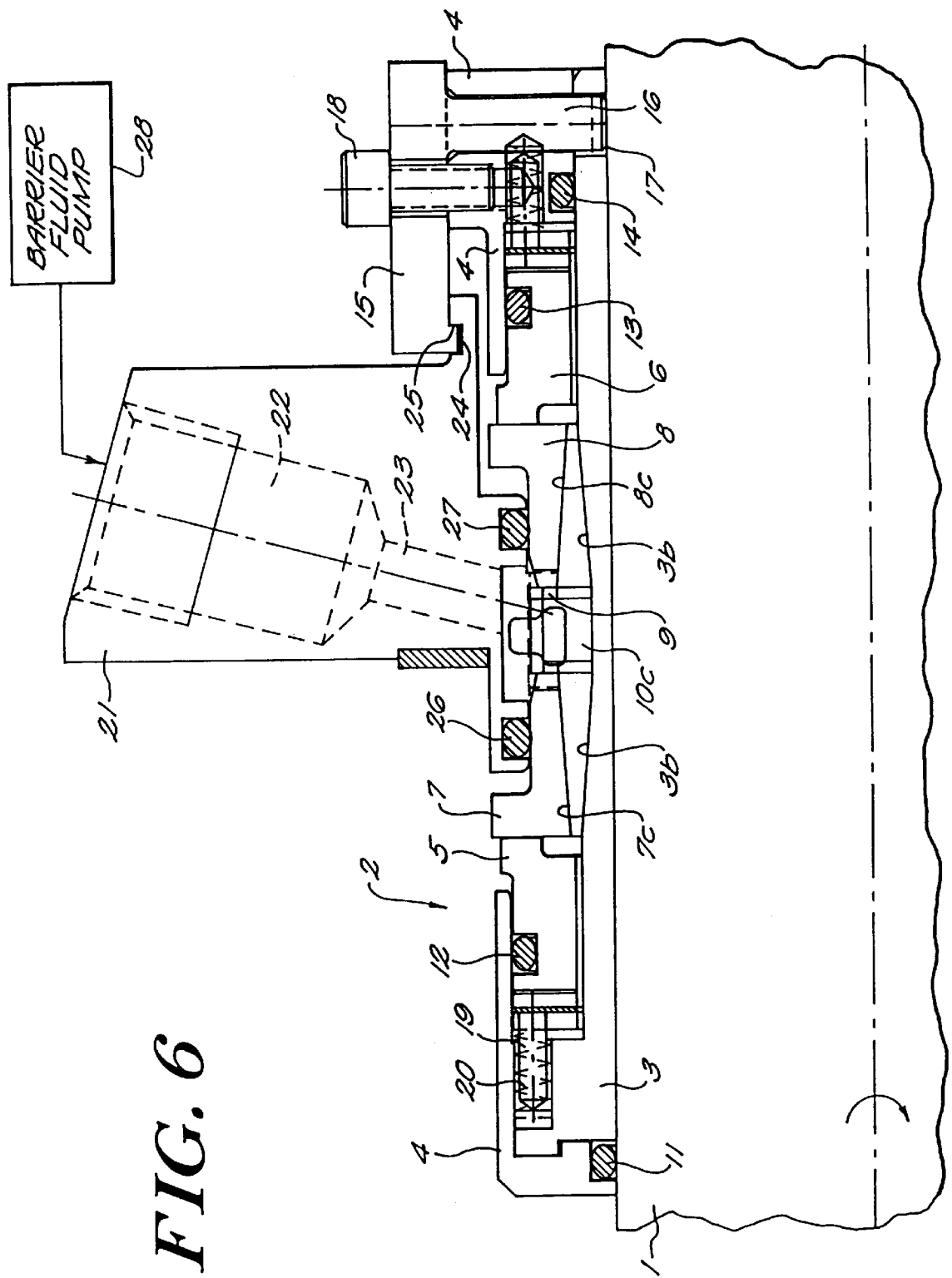
FIG. 6 is a sectional view (but without sectional hatching) of the third embodiment of the seal assembly shown in FIG. 7, with additional components.

In the embodiment of FIGS. 5 and 6, the surface 3b of the sleeve 3 within the barrier fluid chamber 10c is the same as in the embodiment of FIGS. 3 and 4, however, the surfaces 7c and 8c of the respective stationary sealing rings 7 and 8 in this embodiment are inclined in an opposite direction. Specifically, the surfaces 7c and 8c converge axially and radially inwardly toward the shaft relative to a central region of the barrier chamber, and thus the surfaces are closest to the shaft 1 at the respective axial edge regions of the barrier fluid chamber 10c, and are farthest from the shaft 1 at a central region of the barrier fluid chamber 10c.

Figure 7:
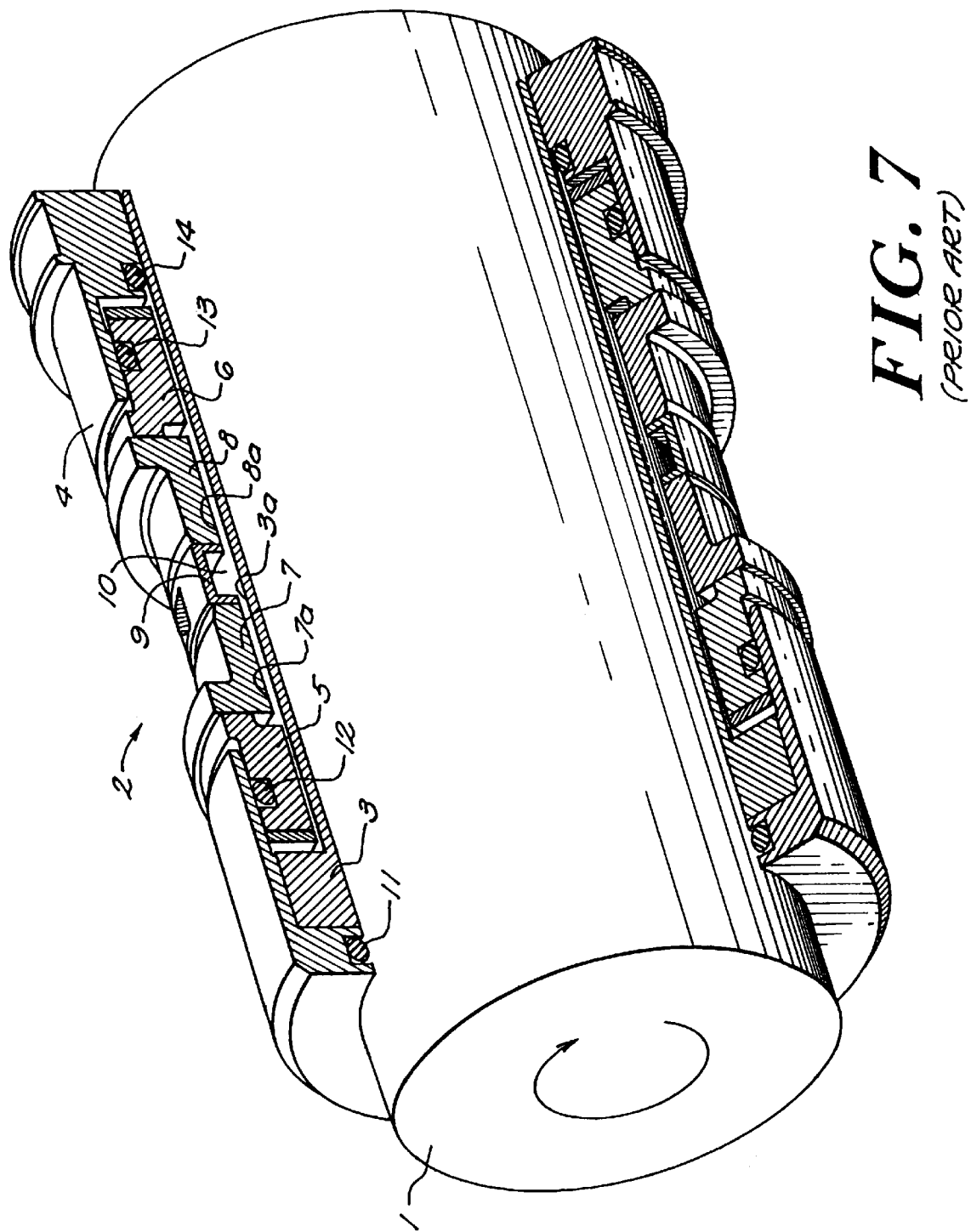
FIG. 7 is a perspective view, partly broken away, of a known cartridge dual seal, as described above.
Figure 8:
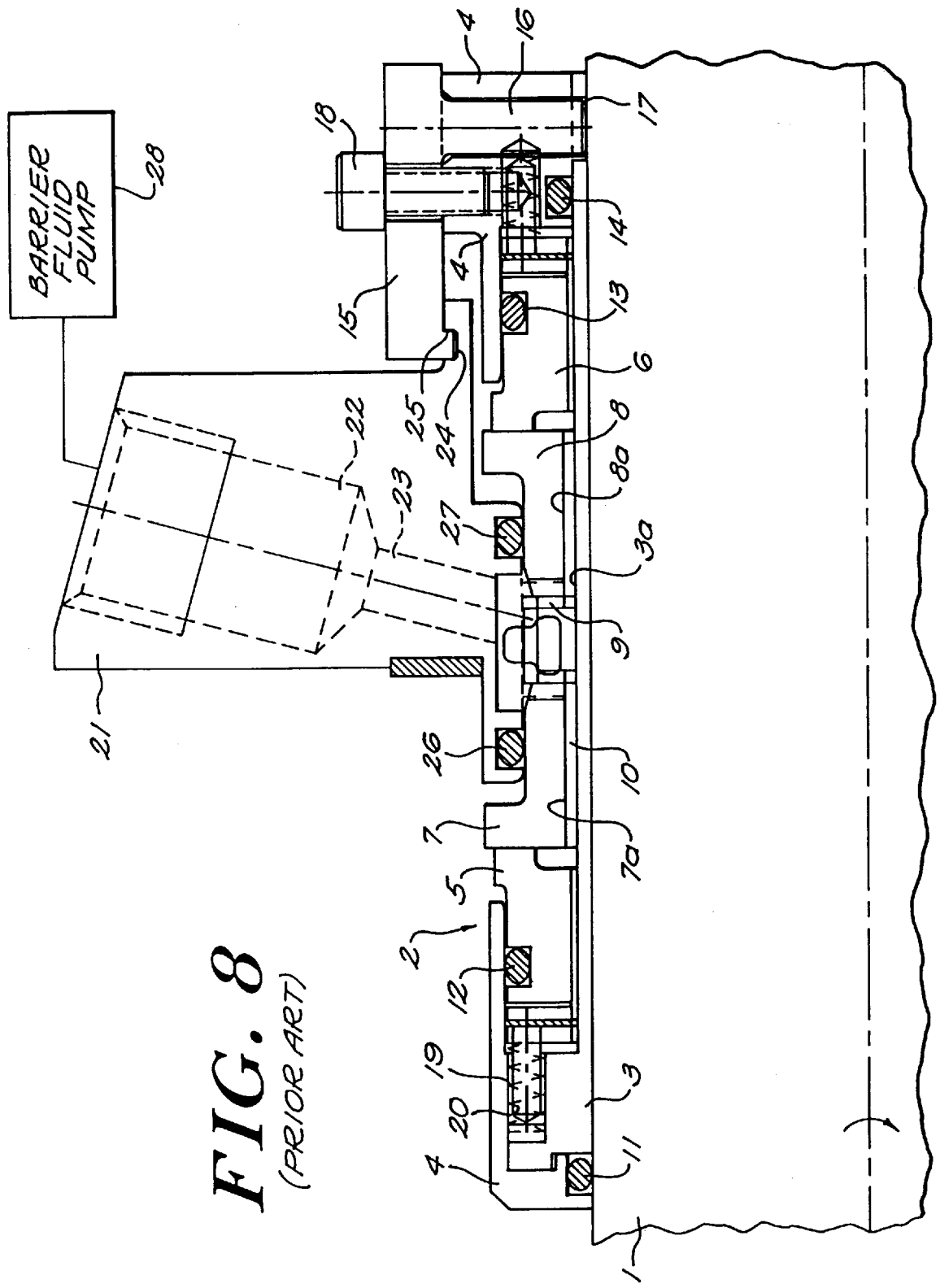
FIG. 8 is a sectional view of the known seal assembly shown in FIG. 7 with additional components, as described above.

In the known cartridge seal structure shown in FIGS. 7 and 8, there exist within the barrier fluid chamber three general areas of recirculation, these being in the central region where the fluid is being pumped in and out of the barrier fluid chamber 10, and in the opposed axial ends, where the faces of the respective two sealing ring and pairs are rubbing against each other. A drawback of this conventional seal is that there is very little or nominal heat exchange among these three zones. Hence one axial end, for example the outboard end represented by seal pair 6,8 may operate at a significantly higher temperature (e.g., 85° C.) than at the inboard opposite end and at the central region (e.g., 45° C.).

The seal embodiments of the present invention each include a barrier fluid chamber 10a that represents a significant improvement over the conventional seals. Specifically, in the embodiment of FIGS. 1 and 2, the zone of recirculation present at the sealing ring surfaces interface (e.g., face seals) extend axially inwardly almost halfway to the center region of the barrier fluid chamber 10b. Computer models have shown that the temperature at the seal faces in this embodiment is approximately 10° F. cooler than the temperature at the seal faces of conventional seals, such as the conventional seal illustrated in FIGS. 7 and 8.

In the embodiment illustrated in FIGS. 3 and 4, the recirculation zones within the chamber (e.g., the areas where barrier fluid recirculates axially and/or circumferentially) extend fully from the seal interfaces at the respective axial ends of the barrier fluid chamber 10b to the central region of the barrier fluid chamber 10b, where pumping takes place. This results in even further lowered face temperatures and superior heat removal relative to conventional seals.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a cartridge dual seal for use with a shaft rotatable around a longitudinal shaft axis and a source of barrier fluid, said cartridge dual seal having first and second rotary seals each including a stationary sealing ring and a rotatable sealing ring, each of said sealing rings of each said rotary seal having a seal face confronting one another when said sealing rings are assembled to form a sealing surface a sleeve co-rotatable with said shaft on which said rotatable sealing rings are mounted and said stationary sealing rings being radially spaced from said sleeve, said stationary sealing rings and a portion of said sleeve defining a chamber having an inner wall formed by said portion of said sleeve and an outer wall formed by said stationary sealing rings, and an inlet communicating said chamber with a source of barrier fluid for introducing barrier fluid from said source into said chamber, said sealing surfaces being disposed towards axial end regions of said chamber, the improvement comprising at least one of said inner wall and said outer wall being non-parallel and tapers axially along at least part of the chamber in a straight-line manner relative to the shaft axis, said chamber having generally closed axially spaced end regions, and wherein said wall configuration promotes the circulation of the barrier fluid from the inlet disposed at a generally central portion of the chamber to the axially spaced end regions and the transfer of heat between said central portion and the end regions, thereby cooling each of said sealing surfaces of said first and second rotary seals.

2. The improvement of claim 1 wherein said inner wall is at a substantially constant radius between said axially spaced ends, said radius extending generally perpendicularly to said shaft axis.

3. The improvement of claim 1 wherein said inner wall diverges radially outwardly from said center region of said chamber toward each of said axially spaced ends.

4. The improvement of claim 1 wherein said outer wall diverges radially outwardly from said central region of said chamber toward each of said axially spaced ends.

5. The improvement of claim 1 wherein said outer wall converges radially inwardly from said central region of said chamber toward each of said axially spaced ends.

6. The improvement of claim 1 wherein said inner wall is at a substantially constant radius between said axially spaced ends, said radius extending generally perpendicularly to said shaft axis and wherein said outer wall diverges radially outwardly from said central region of said chamber toward each of said axially spaced ends.

7. The improvement of claim 1 wherein said inner wall diverges radially outwardly from said center region of said chamber toward each of said axially spaced ends, and wherein said outer wall diverges radially outwardly from said center region of said chamber toward each of said axially spaced ends.

8. The improvement of claim 1 wherein said inner wall diverges radially outwardly from said center region of said chamber toward each of said axially spaced ends, and wherein said outer wall converges radially inwardly from said center region of said chamber toward each of said axially spaced ends.

9. A seal assembly for use with a shaft rotatable around a longitudinal shaft axis, said seal assembly comprising
first and second rotary seals each having a stationary sealing ring and a rotatable sealing ring, each of said sealing rings of each said rotary seal having a seal face confronting one another when said sealing rings are assembled to form a sealing surface;
a sleeve, adapted for co-rotation with said shaft, on which said rotary sealing rings are mounted with said stationary sealing rings being radially spaced from said sleeve;
one of said sealing rings and a portion of said sleeve defining a chamber having an inner wall formed by said sleeve and an outer wall formed by said sealing ring, said sealing surfaces being disposed towards axially separated end regions of said chamber at least one of said inner wall and said outer wall being non-parallel and tapers axially along at least part of said chamber in a straight-line manner relative to the shaft axis said chamber having generally closed axially spaced end regions, and wherein said wall configuration promotes the circulation of the barrier fluid from a generally central portion of the chamber to the axially spaced end regions and promotes heat transfer between said central chamber portion and the chamber end regions thereby cooling each of said sealing surfaces of said first and second rotary seals; and
means for supplying barrier fluid into said central region of said chamber under pressure.

10. The seal assembly of claim 9 wherein said inner wall is at a substantially constant radius between said axially spaced ends, said radius extending generally perpendicularly to said shaft axis.

11. The seal assembly of claim 9 wherein said inner wall diverges radially outwardly from said center region of said chamber toward each of said axially spaced ends.

12. The seal assembly of claim 9 wherein said outer wall diverges radially outwardly from said central region of said chamber toward each of said axially spaced ends.

13. The seal assembly of claim 9 wherein said outer wall converges radially inwardly from said central region of said chamber toward each of said axially spaced ends.

14. The seal assembly of claim 9 wherein said inner wall is at a substantially constant radius between said axially spaced ends, said radius extending generally perpendicularly to said shaft axis and wherein said outer wall diverges radially outwardly from said central region of said chamber toward each of said axially spaced ends.

15. The seal assembly of claim 9 wherein said inner wall diverges radially outwardly from said center region of said chamber toward each of said axially spaced ends, and wherein said outer wall diverges radially outwardly from said center region of said chamber toward each of said axially spaced ends.

16. The seal assembly of claim 9 wherein said inner wall diverges radially outwardly from said center region of said chamber toward each of said axially spaced ends, and wherein said outer wall converges radially inwardly from said center region of said chamber toward each of said axially spaced ends.

17. A shaft seal for use with a source of barrier fluid, said shaft seal comprising:
a shaft rotatable around a longitudinal shaft axis;
a cartridge dual seal having first and second rotary seals each having a stationary sealing ring and a rotatable sealing ring, and a sleeve mounted on said shaft for co-rotation with said shaft, each of said sealing rings of each said rotary seal having a seal face confronting one another when said sealing rings are assembled to form a sealing surface;
said rotatable sealing rings being mounted on said sleeve and said stationary sealing rings being radially spaced from said sleeve;
said stationary sealing rings and a portion of said sleeve defining a chamber having an inner wall formed by said portion of said sleeve and an outer wall formed by said stationary sealing rings, said sealing surfaces being disposed towards generally closed axial end regions of said chamber, at least one of said inner wall and said outer wall being non-parallel and tapers axially along at least part of the chamber in a straight-line manner with respect to the shaft axis; and
an inlet allowing communication of said chamber with said source of barrier fluid for introducing barrier fluid from said source into said chamber;
wherein said configuration of said chamber wall promotes circulation of the barrier fluid from said inlet disposed at a generally central portion of the chamber to the axially spaced end regions and transfers heat between said chamber central portion and the chamber end regions, thereby cooling each of said sealing surfaces of said first and second rotary seals during operation.

18. The seal of claim 17 wherein region said inner wall is generally flat between said axially spaced ends.

19. The seal of claim 17 region wherein said inner wall diverges radially outwardly from said center region of said chamber toward each of said axially spaced ends.

20. The seal of claim 17 region wherein said outer wall diverges radially outwardly from said central region of said chamber toward each of said axially spaced ends.

21. The seal of claim 17 region wherein said outer wall converges radially inwardly from said central region of said chamber toward each of said axially spaced ends.

22. The seal of claim 17 wherein region said inner wall is at a substantially constant radius between said axially spaced ends, said radius extending generally perpendicularly to said shaft axis and wherein said outer wall diverges radially outwardly from said central region of said chamber toward each of said axially spaced ends.

23. The seal of claim 17 region wherein said inner wall diverges radially outwardly from said center region of said chamber toward each of said axially spaced ends, and wherein said outer wall diverges radially outwardly from said center region of said chamber toward each of said axially spaced ends.

24. The seal of claim 17 region wherein said inner wall diverges radially outwardly from said center region of said chamber toward each of said axially spaced ends, and wherein said outer radial wall converges radially inwardly from said center region of said chamber toward each of said axially spaced ends.

25. The seal of claim 17 further comprising a locking ring assembly for fixing said sleeve onto said shaft.

26. A cartridge dual seal comprising:
first and second rotary seals each comprised of a stationary sealing ring and a rotatable sealing ring;
a tubular hollow, cylindrical sleeve having a longitudinal sleeve axis;
said rotatable sealing rings being mounted on said sleeve and said stationary sealing rings being radially spaced from said sleeve;
said stationary sealing rings and a portion of said sleeve defining a chamber having an inner wall formed by said portion of said sleeve, an outer wall defined by said stationary sealing rings, and generally closed, axially spaced end regions, at least one of said inner wall and said outer wall being angled axially along at least part of the chamber in a straight-line manner relative to the sleeve axis; and
a port communicating an interior of said chamber with an exterior of said chamber;
wherein said angled chamber wall promotes circulation of the barrier fluid from said inlet disposed at a generally central portion of the chamber to axially spaced end regions of the chamber and transfers heat between said chamber central portion and said chamber end regions, thereby cooling said first and second rotary seals during operation.

27. The cartridge dual seal of claim 26 wherein central said inner wall is at a substantially constant radius between said axially spaced ends, said radius extending generally perpendicularly to said sleeve axis.

28. The cartridge dual seal of claim 26 central wherein said inner wall diverges radially outwardly from said center region of said chamber toward each of said axially spaced ends.

29. The cartridge dual seal of claim 26 central wherein said outer wall diverges radially outwardly from said central region of said chamber toward each of said axially spaced ends.

30. The cartridge dual seal of claim 26 central wherein said outer wall converges radially inwardly from said central region of said chamber toward each of said axially spaced ends.

31. The cartridge dual seal of claim 26 wherein central said inner wall is at a substantially constant radius between said axially spaced ends, said radius extending generally perpendicularly to said sleeve axis and wherein said outer wall diverges radially outwardly from said central region of said chamber toward each of said axially spaced ends.

32. The cartridge dual seal of claim 26 central wherein said inner wall diverges radially outwardly from said center region of said chamber toward each of said axially spaced ends, and wherein said outer wall diverges radially outwardly from said center region of said chamber toward each of said axially spaced ends.

33. The cartridge dual seal of claim 26 central wherein said inner wall diverges radially outwardly from said center region of said chamber toward each of said axially spaced ends, and wherein said outer wall converges radially inwardly from said center region of said chamber toward each of said axially spaced ends.

34. The cartridge dual seal of claim 26 wherein said port is centrally disposed axially of said chamber.

35. A cartridge dual seal comprising:
a first rotary seal formed by a first stationary sealing ring having first and second surfaces and a first rotatable sealing ring having a first surface, the respective first surfaces of said first stationary sealing ring and said rotatable sealing ring being in sliding contact to form a first sealing surface;
a second rotary seal formed by a second stationary sealing ring having first and second surfaces and a second rotating sealing ring having a first surface, said first surfaces of said second stationary sealing ring and second rotatable sealing ring being in sliding contact to form a second sealing surface;
a tubular, cylindrical sleeve having a longitudinal sleeve axis, with said first and second rotatable sealing rings attached to said sleeve so that said first and second rotary seals are axially spaced from each other along said sleeve axis;
means for mounting said first and second stationary sealing rings radially spaced from said sleeve so that the respective second surfaces of said stationary sealing rings and a portion of said sleeve define a chamber having a central region and generally closed, axially spaced end regions, with said portion of said sleeve being parallel to said sleeve axis and the respective second surfaces of said stationary sealing rings each diverging radially outwardly in a generally straight-line manner from said central region of said chamber toward said axially spaced ends of said chamber; and
a port communicating an interior of said chamber with an exterior of said chamber;
wherein said chamber wall promotes circulation of the barrier fluid from said port disposed generally at said central portion of the chamber to said axially spaced end regions of the chamber, and transfers heat between said chamber central portion and said end regions, thereby cooling said first and second sealing surfaces during operation.

36. A cartridge dual seal comprising:
a first rotary seal formed by a first stationary sealing ring having first and second surfaces and a first rotatable sealing ring having a first surface, the respective first surfaces of said first stationary sealing ring and said rotatable sealing ring being in sliding contact with each other to form a first sealing surface;
a second rotary seal formed by a second stationary sealing ring having first and second surfaces and a second rotating sealing ring having a first surface, said first surfaces of said second stationary sealing ring and second rotatable sealing ring being in sliding contact with each other to form a second sealing surface;
a tubular, cylindrical sleeve having a longitudinal axis, with said first and second rotatable sealing rings attached to said sleeve so that said first and second rotary seals are axially spaced from each other along said sleeve axis;
means for mounting said first and second stationary sealing rings radially spaced from said sleeve so that the respective second surfaces of said stationary sealing rings and a portion of said sleeve define a chamber having a central region and generally closed, axially spaced end regions, with said portion of said sleeve diverging radially outwardly from said central region of said chamber toward each of said axially spaced ends of said chamber in a generally straight-line manner, and the respective second surfaces of said stationary sealing rings each diverging radially outwardly from said central region of said chamber toward said axially spaced ends of said chamber in a generally straight-line manner; and a port communicating an interior of said chamber with an exterior of said chamber;

wherein said chamber wall promotes circulation of the barrier fluid from said central portion of the chamber to said axially spaced end regions of the chamber, and transfers heat between said chamber central portion and said end regions, thereby cooling said first and second sealing surfaces during operation.

37. A cartridge dual seal as claimed in claim 36 wherein said portion of said sleeve diverges radially outwardly from said central region of said chamber toward each of said axially spaced ends of said chamber at a first angle, and wherein the respective secondary surfaces of said sealing rings each diverge radially outwardly from said central region of said chamber toward said axially spaced ends of said chamber at a second angle equal to said first angle.

38. A cartridge dual seal comprising:

a first rotary seal formed by a first stationary sealing ring having first and second surfaces and a first rotatable sealing ring having a first surface, the respective first surfaces of said first stationary sealing ring and said rotatable sealing ring being in sliding contact;

a second rotary seal formed by a second stationary sealing ring having first and second surfaces and a second rotating sealing ring having a first surface, said first surfaces of said second stationary sealing ring and second rotatable sealing ring being in sliding contact;

a tubular, cylindrical sleeve having a longitudinal sleeve axis, with said first and second rotatable sealing rings attached to said sleeve so that said first and second rotary seals are axially spaced from each other along said sleeve axis; and means for mounting said first and second stationary sealing rings radially spaced from said sleeve so that the respective second surfaces of one of said sealing rings and a portion of said sleeve define a chamber having a central region and generally closed, axially spaced end regions, with said portion of said sleeve diverging radially outwardly from said central region of said chamber toward each of said axially spaced ends of said chamber in a straight-line manner, and the respective second surfaces of said sealing rings each diverging radially inwardly from said central region of said chamber toward said axially spaced ends of said chamber in a straight-line manner;

wherein said chamber wall promotes circulation of the barrier fluid from said central portion of the chamber to said axially spaced end regions of the chamber, and transfers heat between said chamber central portion and said end regions, thereby cooling said first and second rotary seals during operation.

39. A method for promoting cooling of a cartridge dual seal comprising the steps of:

abutting a first stationary sealing ring and a first rotatable sealing ring to form a first rotary seal having a first sealing surface;

abutting a second stationary sealing ring and a second rotatable sealing ring to form a second rotary seal having a second sealing surface;

attaching a sleeve to a rotatable shaft so that said shaft and said sleeve are co-rotatable around a longitudinal shaft axis;

mounting said first and second rotating sealing rings on said sleeve for co-rotation with said sleeve;

mounting said first and second stationary sealing rings axially spaced from said sleeve and thereby forming a chamber between said first and second stationary sealing rings and a portion of said sleeve, said chamber having an inner radial wall formed by said portion of said sleeve and an outer radial wall formed by at least one of said sealing rings, said chamber having generally closed, axially spaced end regions;

supplying barrier fluid under pressure into said chamber;

orienting at least one of said inner wall and said outer wall axially non-parallel to said shaft axis such that one of said walls tapers axially along at least part of the chamber in a straight-line manner; and promoting circulation of the barrier fluid from a central portion of the chamber to axially spaced end regions of the chamber, said barrier fluid transferring heat between said chamber central portion and said end regions, thereby cooling said first and second sealing surfaces of said first and second rotary seals during operation.

40. A method as claimed in claim 39 wherein the step of orienting at least one of said inner wall and said outer wall non-parallel to said shaft axis comprises the steps of:

orienting said inner wall parallel to said shaft axis and slanting said outer wall relative to said shaft axis.

41. A method as claimed in claim 40 wherein the step of slanting said outer wall comprises diverging said outer wall radially outwardly from said central region of said chamber toward each of said axially spaced ends.

42. A method as claimed in claim 40 wherein the step of orienting at least one of said inner wall and said outer wall non-parallel to said shaft axis comprises the steps of:

diverging said inner wall radially outwardly from said central region of said chamber toward each of said axially spaced ends of said chamber; and diverging said outer wall radially outwardly from said central region of said chamber toward of each said axially spaced ends of said chamber.

43. A method as claimed in claim 42 wherein the step of diverging said inner wall radially outwardly comprises diverging said inner wall radially outwardly from said central region of said chamber toward each of said axially spaced ends of said chamber at a first angle, and wherein the step of diverging said outer wall comprises diverging said outer wall radially outwardly from said central region of said chamber toward each of said axially spaced ends of said chamber at a second angle equal to said first angle.

44. A method as claimed in claim 39 wherein the step of orienting at least one of said inner wall and said outer wall non-parallel to said shaft axis comprises the steps of:

diverging said inner wall radially outwardly from said central region of said chamber toward each of said axially spaced ends of said chamber; and converging said outer wall radially inwardly from said central region of said chamber toward of each said axially spaced ends of said chamber.

45. In a cartridge dual seal for use with a shaft rotatable around a longitudinal shaft axis and a source of barrier fluid, said cartridge dual seal having first and second rotary seals each comprised of a stationary sealing ring and a rotatable sealing ring, a sleeve co-rotatable with said shaft on which said rotatable sealing rings are mounted and said stationary sealing rings being radially spaced from said sleeve, said stationary sealing rings and a portion of said sleeve defining a chamber having an inner wall formed by said portion of said sleeve and an outer wall formed by said stationary sealing rings, said chamber having generally closed, axially spaced end regions and an inlet communicating said chamber with said source of barrier fluid for introducing barrier fluid from said source into said chamber, the improvement comprising:

at least one of said inner wall and said outer wall being axially frustoconical relative to the shaft axis, wherein said chamber wall configuration promotes the circulation of the barrier fluid from a generally central portion of the chamber to axially spaced end regions, and transfers heat between said central portion and the end regions thereby cooling said first and second rotary seals during operation.

46. A cartridge dual seal comprising:

a first rotary seal formed by a first stationary sealing ring having first and second surfaces and a first rotatable sealing ring having a first surface, the respective first surfaces of said first stationary sealing ring and said rotatable sealing ring being in sliding contact;

a second rotary seal formed by a second stationary sealing ring having first and second surfaces and a second rotating sealing ring having a first surface, said first surfaces of said second stationary sealing ring and second rotatable sealing ring being in sliding contact;

a tubular, cylindrical sleeve having a longitudinal axis, with said first and second rotatable sealing rings attached to said sleeve so that said first and second rotary seals are axially spaced from each other along said sleeve axis;

means for mounting said first and second stationary sealing rings radially spaced from said sleeve so that the respective second surfaces of said stationary sealing rings and a portion of said sleeve define a chamber having a central region and axially spaced ends, with said portion of said sleeve diverging radially outwardly from said central region of said chamber toward each of said axially spaced ends of said chamber, and the respective second surfaces of said stationary sealing rings each diverging radially outwardly from said central region of said chamber toward said axially spaced ends of said chamber; and a port communicating an interior of said chamber with an exterior of said chamber, wherein said portion of said sleeve diverges radially outwardly from said central region of said chamber toward each of said axially spaced ends of said chamber at a first angle, and wherein the respective secondary surfaces of said sealing rings each diverge radially outwardly from said central region of said chamber toward said axially spaced ends of said chamber at a second angle equal to said first angle.

47. A method for promoting cooling of a cartridge dual seal comprising the steps of:

abutting a first stationary sealing ring and a first rotatable sealing ring to form a first rotary seal;

abutting a second stationary sealing ring and a second rotatable sealing ring to form a second rotary seal;

attaching a sleeve to a rotatable shaft so that said shaft and said sleeve are co-rotatable around a longitudinal shaft axis;

mounting said first and second rotating sealing rings on said sleeve for co-rotation with said sleeve;

mounting said first and second stationary sealing rings axially spaced from said sleeve and thereby forming a chamber between said first and second stationary sealing rings and a portion of said sleeve, said chamber having an inner radial wall formed by said portion of said sleeve and an outer radial wall formed by said first and second stationary sealing rings;

supplying barrier fluid under pressure into said chamber; and diverging said inner wall radially outwardly from a central region of said chamber toward each of axially spaced ends of said chamber at a first angle; and diverging said outer wall radially outwardly from said central region of said chamber toward of each said axially spaced ends of said chamber at a second angle equal to said first angle, for promoting circulation of said barrier fluid in said chamber and thereby cooling each of said first and second rotary seals.

* * * * *